US010054421B2

(12) United States Patent
Ishimaru et al.

(10) Patent No.: US 10,054,421 B2
(45) Date of Patent: Aug. 21, 2018

(54) APPARATUS FOR MEASURING THREE-DIMENSIONAL POSITION OF TARGET OBJECT

(71) Applicants: DENSO CORPORATION, Kariya, Aichi-pref. (JP); NAGOYA INSTITUTE OF TECHNOLOGY, Nagoya-shi, Aichi (JP)

(72) Inventors: Kazuhisa Ishimaru, Nishio (JP); Noriaki Shirai, Kariya (JP); Jun Sato, Nagoya (JP); Fumihiko Sakaue, Nagoya (JP)

(73) Assignees: DENSO CORPORATION, Kariya, Aichi-pref. (JP); NAGOYA INSTITUTE OF TECHNOLOGY, Nagoya-shi, Aichi (JP)

( * ) Notice: Subject to any disclaimer, the term of this patent is extended or adjusted under 35 U.S.C. 154(b) by 0 days.

(21) Appl. No.: 15/611,386

(22) Filed: Jun. 1, 2017

(65) Prior Publication Data

US 2017/0363416 A1    Dec. 21, 2017

(30) Foreign Application Priority Data

Jun. 1, 2016 (JP) ................................. 2016-110359

(51) Int. Cl.
*G06K 9/00* (2006.01)
*G01B 11/00* (2006.01)
(Continued)

(52) U.S. Cl.
CPC ........ *G01B 11/002* (2013.01); *G06K 9/00791* (2013.01); *G06K 9/46* (2013.01); *G06T 7/70* (2017.01); *H04N 5/247* (2013.01)

(58) Field of Classification Search
CPC .... G06T 7/70; G01B 11/002; G06K 9/00791; G06K 9/46; H04N 5/247
(Continued)

(56) References Cited

U.S. PATENT DOCUMENTS 6,751,344 B1 *  6/2004  Grumbine .......... G01B 11/2513
                                                      382/128
2013/0147948 A1 *  6/2013  Higuchi ............ H04N 13/0246
                                                      348/135

FOREIGN PATENT DOCUMENTS

JP    2012-075060 A    4/2012
JP    2015-135317      7/2015

OTHER PUBLICATIONS

Yuanyuan Ding, Jingyi Yu, and Peter Sturm, Multiperspective Stero Matching and Volumetric Reconstruction, in 8 pages, Department of Computer and Information Sciences, University of Delaware, Perception Laboratory INRIA Grenoble, France.
(Continued)

*Primary Examiner* — Gregory F Cunningham
(74) *Attorney, Agent, or Firm* — Knobbe, Martens, Olson & Bear, LLP

(57) ABSTRACT

A position measuring apparatus detects, from respective first and second imaging planes of first and second captured images, first and second corresponding points estimated to represent a common three-dimensional position. The apparatus calculates first to fourth projected points. Each of the first and second projected points represents a projected point of the first corresponding point on a corresponding one of the first and second common planes. Each of the third and fourth projected points represents a projected point of the second corresponding point on a corresponding one of the first and second common planes. The apparatus calculates a first beam connecting the first and second projected points, a second beam connecting the third and fourth projected
(Continued)

points, and a point having a minimum square distance relative to each of the first and second beams as a restored point representing the three-dimensional position of the first and second corresponding points.

6 Claims, 6 Drawing Sheets

(51) Int. Cl.
    *G06T 7/70*     (2017.01)
    *G06K 9/46*     (2006.01)
    *H04N 5/247*     (2006.01)
(58) Field of Classification Search
    USPC .......................................................... 382/106
    See application file for complete search history.

(56) References Cited

OTHER PUBLICATIONS

Richard Hartley and Andrew Zisserman, Multiple View Geometry in Computer Vision, in 673 pages, Cambridge University Press.

* cited by examiner

APPARATUS FOR MEASURING THREE-DIMENSIONAL POSITION OF TARGET OBJECT

CROSS REFERENCE TO RELATED APPLICATIONS

This application is based on and claims the benefit of priority from Japanese Patent Application 2016-110359 filed on Jun. 1, 2016, the disclosure of which is incorporated in its entirety herein by reference.

TECHNICAL FIELD

The present disclosure relates to apparatuses for measuring the three-dimensional positions of objects using images obtained from cameras.

BACKGROUND

There are known position measuring apparatuses for measuring the three-dimensional position of an object using images obtained from cameras. Such a position measuring apparatus is based on a camera model, i.e. a single-focal cameral model, configured such that light enters each camera while focusing on the center of the lens of the corresponding camera.

The measurement accuracy of such a position measuring apparatus based on the single-focal camera model may greatly decrease if an object is placed between each camera and a target subject, for example, if each in-vehicle camera captures a target subject through the front windshield.

In contrast, Japanese Patent Application Publication No. 2012-75060, which will be referred to as a published document, discloses a non-single-focal camera model describing a non-linear map in place of the single-focal camera model describing a linear map.

SUMMARY

Such a non-single-focal camera model assumes two planes for each camera; the two planes for each camera are arranged to sandwich a space in which an object to be measured is located. The non-single-focal camera model has intrinsic parameters for each camera; the intrinsic parameters for each camera are defined to express a non-linear map from an image plane of the corresponding camera to each of the two planes. The non-single-focal camera model also has extrinsic parameters for each camera; the extrinsic parameters for each camera are defined to represent the positional relationship among the cameras.

The non-single-focal camera model obtains, based on the intrinsic parameters for each camera, a projected point from a point on an image captured by the corresponding camera to each of the planes. Then, the non-single-focal camera model defines a line connecting the projected points as a back projection beam. That is, the non-single-focal camera model obtains, for each camera, the back projection beam for a common point that is commonly included in the captured images of the respective cameras. In addition, the non-single-focal camera model adjusts the positional relationship among the back projection beams obtained for the respective cameras using the extrinsic parameters of the respective cameras to correspondingly obtain a point of intersection among the back projection beams. This enables the point of intersection to be obtained as a restored point of the common point.

As described above, the conventional non-single-focal camera model needs to define both the intrinsic parameters and extrinsic parameters. For camera calibration, it is necessary to adjust the intrinsic parameters and the extrinsic parameters while linking them to each other. This may result in the adjustment work being complicated.

A calibration apparatus disclosed in the published document needs specific devices for calibrating cameras. For this reason, it may be difficult for the calibration apparatus to dynamically calibrate cameras, which are being used as, for example, in-vehicle cameras, if the positional relationship among the cameras is changed due to, for example, their vibrations.

The present disclosure aims to provide apparatuses for measuring a three-dimensional position of an object using images, each of which is configured such that calibration of cameras is simpler.

An aspect of the present disclosure is a position measuring apparatus including an image obtaining unit, a storage unit, a correspondence detector, a projected-point calculator, and a restored-point calculator.

The image obtaining unit is configured to obtain first and second images captured by respective first and second cameras from different viewpoints of the first and second cameras. The first and second images contain a common imaging region.

The storage unit is configured to store:

1. a first camera parameter that represents a relationship between a first imaging plane included in the first image and each of first and second common planes based on a camera model; and 2. a second camera parameter that represents a relationship between a second imaging plane included in the second image and each of the first and second common planes based on the camera model.

The camera model describes nonlinear map relationships from each of first and second imaging planes to the first and second common planes. The first and second common planes are respectively set to have different positions relative to the reference plane in a depth direction of a world coordinate system.

The correspondence detector is configured to detect, from the respective first and second imaging planes of the first and second images, first and second corresponding points on the respective first and second imaging planes. The first and second corresponding points are estimated to represent a common three-dimensional position.

The projected-point calculator is configured to calculate, based on the first and second camera parameters stored in the storage unit, first to fourth projected points. The first projected point represents a projected point of the first corresponding point on the first common plane, and the second projected point represents a projected point of the first corresponding point on the second common plane. The third projected point represents a projected point of the second corresponding point on the first common plane, and the fourth projected point represents a projected point of the second corresponding point on the second common plane.

The restored-point calculator is configured to calculate:

1. a line connecting the first projected point on the first common plane and the second projected point on the second common plane as a first beam;

2. a line connecting the third projected point on the first common plane and the fourth projected point on the second common plane as a second beam; and 3. a point having a minimum square distance relative to each of the first and second beams as a restored point, the restored point representing the three-dimensional position of the first and second corresponding points.

This configuration eliminates the need to use extrinsic parameters describing the relationships between the first and second cameras, which is different from a conventional non-single-focal camera model to set projection planes for each of the first and second cameras. This reduces the number of parameters required to calculate a restored point.

In addition, this configuration simply uses parameters corresponding to the intrinsic parameters in the above conventional technology as the first and second camera parameters. This results in calibration of the first and second camera parameters being more simplified, and the calculation accuracy of the restored point to be more improved.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes an exemplary embodiment of the present disclosure with reference to the accompanying drawings.

[1. Structure]

Figure 1:
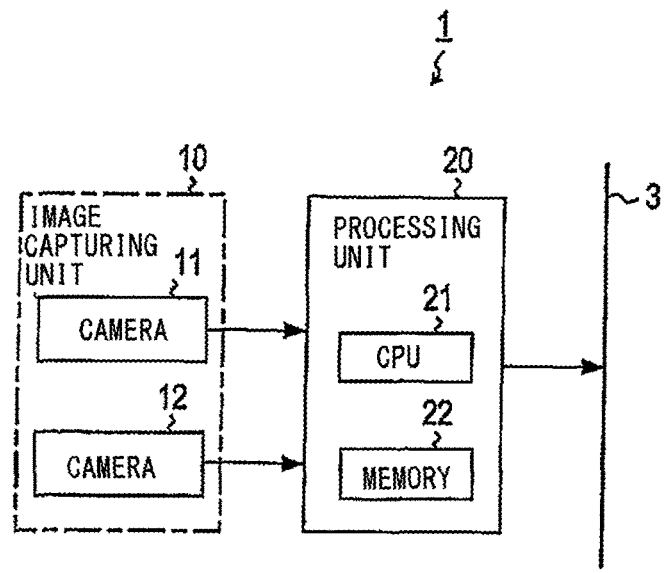
FIG. 1 is a block diagram illustrating the structure of a position measuring apparatus according to an exemplary embodiment.

A position measuring apparatus 1 illustrated in FIG. 1 is configured to use plural captured images each including a target subject to thereby measure a three-dimensional distance from the apparatus 1 to a point in each captured image.

The position measuring apparatus 1 is installed in a vehicle, such as a passenger vehicle, and includes an image capturing unit 10 and a processing unit 20. The position measuring apparatus 1 is connected to other in-vehicle devices via an in-vehicle network 3.

The image capturing unit 10 includes a plurality of cameras that constitute a camera array. The camera array is configured such that the cameras are arranged in a lattice pattern. A parallel stereo camera system, which is used in, for example, in-vehicle camera systems, including two cameras arranged in a horizontal direction can be used as a type of the camera array. The following describes a pair of cameras 11 and 12 constituting a parallel stereo cameral system. Note that the number of cameras are not limited to two. That is, three or more cameras can be used.

Each of the cameras 11 and 12 is arranged in the compartment of the vehicle to capture an imaging region through the front windshield of the vehicle; the imaging region is located in the forward direction of the vehicle. The imaging regions of the cameras 11 and 12 have a common imaging area. That is, the image capturing unit 10 is configured to obtain plural images simultaneously captured from different viewpoints; each of the captured images includes the common imaging region. Then, the image capturing unit 10 is configured to supply the captured images to the processing unit 20.

The processing unit 20 is configured by mainly an available microcomputer including a CPU 21 and a semiconductor memory, such as a RAM, ROM, and/or flash memory, 22. The semiconductor memory 22 will be referred to as a memory 22.

For example, the CPU 21 can run one or more programs stored in the memory 22 to correspondingly implement various functions of the processing unit 20. In other words, the CPU 21 can run programs stored in the memory 22, thus performing one or more methods in accordance with the corresponding one or more programs. One or more microcomputers can constitute the processing unit 20.

The functions implemented by execution of the programs by the CPU 21 include a distance calculating routine, which will be described in detail later. The various functions of the processing unit 20, which are implemented by software, but at least part of the functions can be implemented by a combination of electronic circuits including digital circuits, which include logic gates and/or analog circuits.

[2. Camera Model]

The following describes the non-single-focal camera model that serves as the base of the distance calculating routine. The non-single-focal camera model is a model for precisely describing, under the condition that light beams are refracted by glass or the like located in front of the cameras, the pat of each of the refracted light beams.

Figure 2:
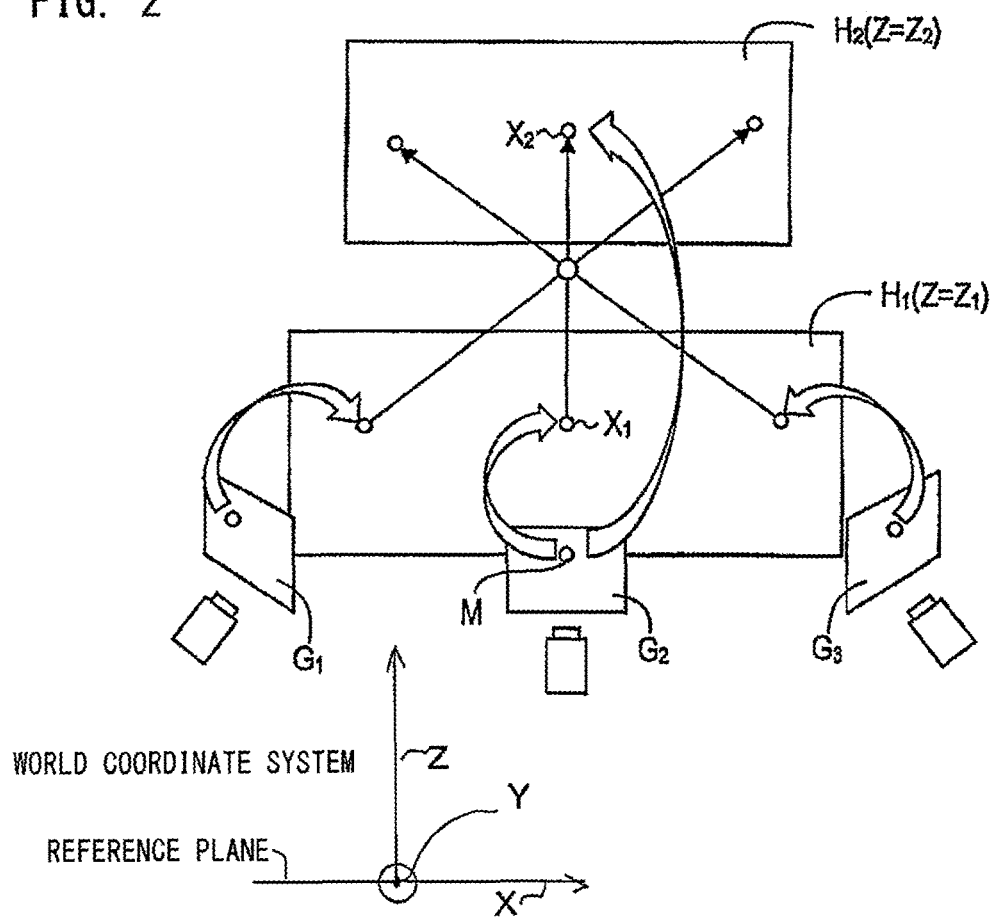
FIG. 2 is a diagram describing a non-single-focal camera model.

As illustrated in FIG. 2, the non-single-focal camera model describes projection of three-dimensional points in a common imaging region by respective plural cameras on two dimensional images using two planes as the two-dimensional images. FIG. 2 illustrates the non-single-focal camera model having three cameras. Note that the number of cameras is not limited to three cameras, and can be set to two or more cameras.

The non-single-focal camera model assumes two common planes $H_1$ and $H_2$ as projection planes; the common planes $H_1$ and $H_2$ are arranged to sandwich a restoration-target space. Then, the non-single-focal camera model defines nonlinear maps from image planes $G_n$ of the respective cameras to each common plane $H_j$ where n is 1, 2, and 3, and j is 1 and 2. Specifically, the non-single-focal camera model defines nonlinear maps from the three image planes $G_1$ to $G_3$ of the respective cameras to each of the two common planes $H_1$ and $H_2$.

That is, the conventional non-single-focal camera model defines two projection planes for each camera, but the non-single-focal camera model according to this embodiment defines two common planes $H_1$ and $H_2$ that are used in common by the cameras. This is greatly different from the conventional non-single-focal camera model. Using the common planes $H_1$ and $H_2$ enables extrinsic parameters defining the relationship among the cameras to be eliminated.

In this embodiment, the direction, which is perpendicular to a reference plane defined to the apparatus 1 and is away from the reference plane, i.e. the depth direction with respect to the reference plane, is defined as the Z direction of a world coordinate system. Note that a front surface of the vehicle in which the apparatus 1 is installed is for example used as the reference plane.

Then, a plane whose Z-axis coordinate is $Z_1$ is defined as the common plane $H_1$, and a plane whose Z-axis coordinate is $Z_2$, which is different from $Z_1$, is defined as the common plane $H_2$.

In addition, a point $X_j$ on the common plane $H_j$ is expressed by the following equation (1):

$$X_j = [x_{1j}, x_{2j}, Z_j]^T \quad (1)$$

Where

1. $x_{1j}$ represents a coordinate in an X-axis perpendicular to the Z-axis and parallel to the reference plane in the world coordinate system; this coordinate will be referred to as a horizontal coordinate 2. $x_{2j}$ represents a coordinate in a Y-axis perpendicular to the Z-axis and X-axis; this coordinate will be referred to as a vertical coordinate Transformation from an image point M on the image plane $G_n$ of each camera to a projected point $X_1$ of the common plane $H_1$ can be carried out while the fixed value of $Z_j$ is ignored. Similarly, transformation from the image point M on the image plane $G_n$ of each camera to a projected point $X_2$ of the common plane $H_2$ can be carried out while the fixed value of $Z_j$ is ignored. This embodiment defines a nonlinear map from the image point $M (m_1, m_2)$ on the image plane $G_n$ to the horizontal coordinate $x_{1j}$ or the vertical coordinate $x_{2j}$ using a K-th order polynomial as expressed by the following equation (2):

$$x_{ij} = \frac{1}{\lambda} \sum_{k=0}^{K} \sum_{l=0}^{K-k} a_{kl} m_1^k m_2^l \,(i = 1, 2; j = 1, 2) \quad (2)$$

$$\lambda = \sum_{k=0}^{K} \sum_{l=0}^{K-k} a_{kl} m_1^k m_2^l$$

Where

1. $m_1$ represents the horizontal coordinate on the image plane $G_n$

2. $m_2$ represents the vertical coordinate on the image plane $G_n$.

3. $a_{kl}$ represents coefficients used for the transformation, which serve camera parameters Note that the camera parameters are defied for the respective horizontal and vertical coordinates $x_{11}, x_{21}, x_{12}, x_{22}$ of the common planes $H_1$ and $H_2$.

This transformation is defined by combining nonlinear transformation using a K-th order polynomial and plane projective transformation with each other. In particular, the transformation is identical to the plane projective transformation when K is set to 1. Combining the plane projective transformation with a K-th order polynomial enables rotation of cameras to be efficiently expressed.

Note that an initial value of each camera parameter $a_{kl}$ is set to a value previously obtained in experiments. Thereafter, the CPU 21 updates the value of each camera parameter $a_{kl}$ each time the CPU 21 performs the distance calculating routine.

Figure 3:
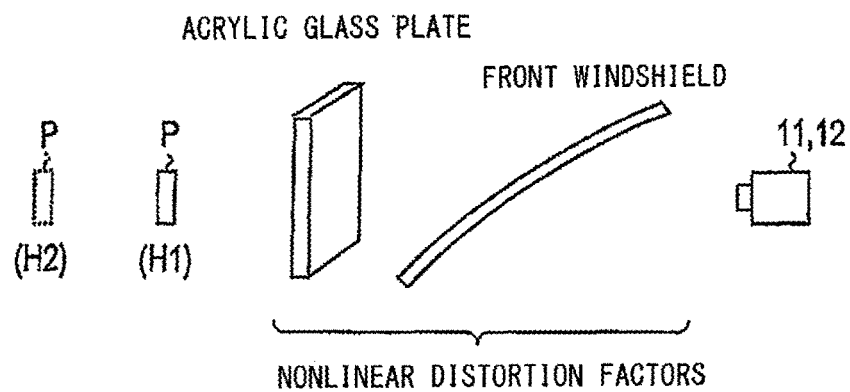
FIG. 3 is a diagram illustrating a measurement environment used when initial values of camera parameters of each camera illustrated in FIG. 1 are set in experiments.
Figure 4:
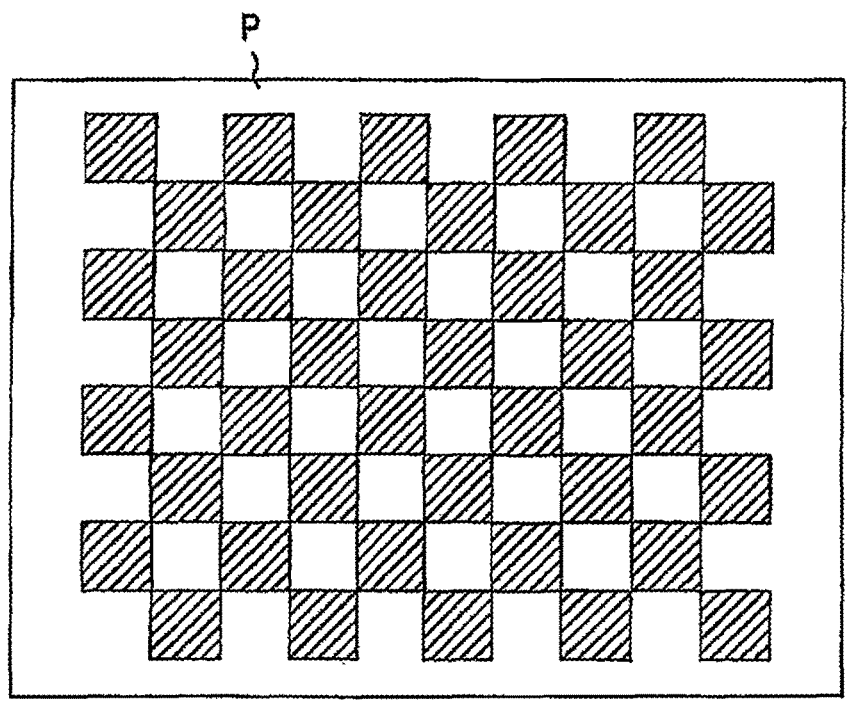
FIG. 4 is a diagram illustrating an example of a test pattern used by the exemplary embodiment.

When the initial value of each camera parameter $a_{kl}$ is obtained, as illustrated in FIG. 3, the cameras 11 and 12 are arranged with respect to nonlinear distortion factors, such as the front windshield, as in the case of the cameras 11 and 12 being actually used. The same test patterns P are arranged at the corresponding positions of the respective common planes $H_1$ and $H_2$. Then, each of the cameras 11 and 12 captures the test patterns P through the nonlinear distortion factors. Note that, the test patterns P, a predetermined pattern can be used; the pattern is comprised of square pixels having two colors, such as white and black, with different luminance levels while the square pixels are arranged in a grid pattern (see FIG. 4).

For example, the CPU 21 identifies, based on the captured results of the respective cameras 11 and 12, the image points, i.e. corresponding points, $M(m_1, m_2)$ on the respective imaging planes $G_n$, i.e. $G_{11}$ and $G_{12}$; the image points $M (m_1, m_2)$ of the respective imaging planes $G_{11}$ and $G_{12}$ show the same three-dimensional point.

Then, the CPU 21 obtains, using the above equation (2), the values of the camera parameters $a_{kl}$ in accordance with the relationships between 1. The positions $(m_1, m_2)$ of the image points M on the respective imaging planes $G_n$ 2. The actual known position $(x_{11}, x_{12})$ of the corresponding point on the test pattern P disposed at the common plane $H_1$ 3. The actual known position $(x_{12}, x_{22})$ of the corresponding point on the test pattern P disposed at the common plane $H_2$ The transformation equation can be expressed by the following equation (3) having a matrix format when K is set to 2:

$$\begin{pmatrix} x_1 \\ x_2 \end{pmatrix} = \frac{1}{\lambda} \begin{pmatrix} a_{20} & a_{11} & a_{02} & a_{10} & a_{01} & a_{00} \\ b_{20} & b_{11} & b_{02} & b_{10} & b_{01} & b_{00} \end{pmatrix} \begin{pmatrix} m_1^2 \\ m_1 \times m_2 \\ m_2^2 \\ m_1 \\ m_2 \\ 1 \end{pmatrix} \quad (3)$$

Where $\lambda = c_{10}m_1 + c_{01}m_2 + c_{00}$

Note that this equation is a transformation equation to any one of the common planes $H_1$ and $H_2$. For simplicity, in this transformation equation, the parameter j, which identifies the common plane $H_j$, is omitted. In addition, the camera parameter used for transformation to the horizontal coordinate $x_1$ is represented by $a_{kl}$, and the camera parameter used for transformation to the vertical coordinate $x_2$ is represented by $b_{kl}$.

[3. Distance Measuring Routine]

Figure 5:
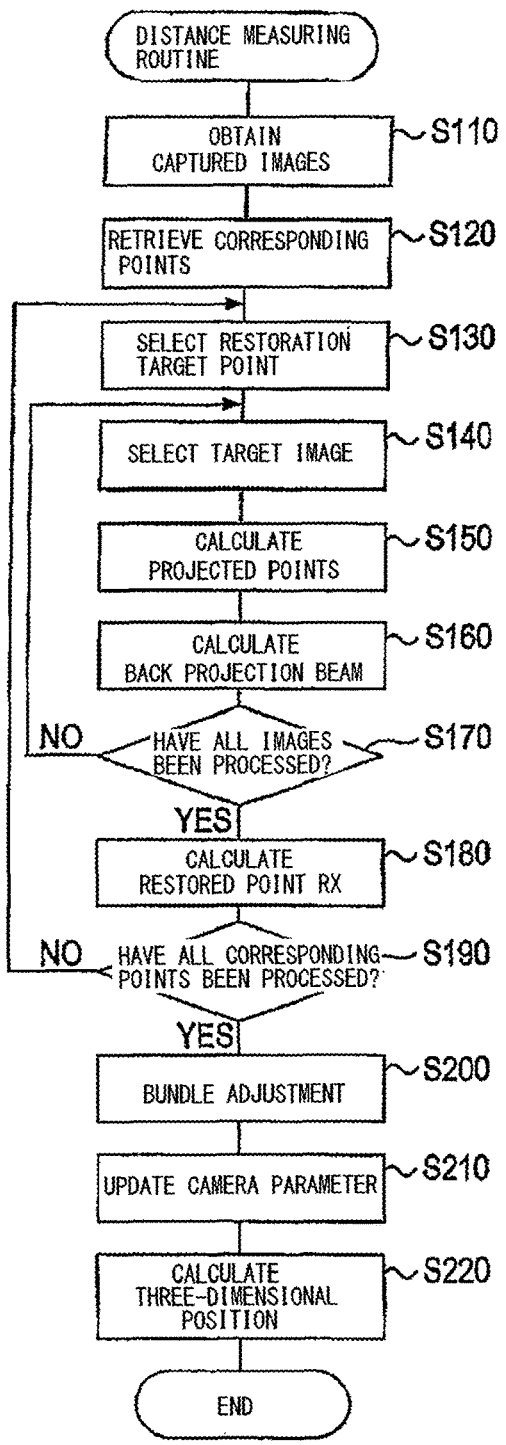
FIG. 5 is a flowchart schematically illustrating a distance measuring task carried out by a processing unit illustrated in FIG. 1.

Next, the following describes the distance measuring routine carried out by the CPU 21 of the processing unit 20 using the flowchart illustrated in FIG. 5. This distance measuring routine is repeatedly carried out in a predetermined period.

Note that, in the memory 22, a program set for the distance measuring routine and the initial values of the camera parameters $a_{kl}$, which were experimentally obtained, are at least stored. In particular, two sets of the initial values of the camera parameters $a_{kl}$ are required for each camera in order to obtain the positions $(x_{11}, x_{21})$ and $(x_{12}, x_{22})$. One set of the initial values of the camera parameters $a_{kl}$ include all components required to calculate the vertical coordinate, horizontal coordinate, and the λ. Two of this set of the initial values are required.

For example, because the two cameras 11 and 12 are used in this embodiment, four sets of initial values of the camera parameters $a_{kl}$ are prepared.

Note that, when the equation (3) is used, fifteen initial values, which include six initial values of the camera parameters $a_{kl}$ for obtaining the position $(x_{1j}, x_{2j})$, six initial values of the camera parameters $b_{kl}$ for obtaining the position $(x_{1j}, x_{2j})$, and three initial values of the camera parameters $c_{kl}$, of the first set of the parameter parameters and fifteen initial values, which include six initial values of the camera parameters $a_{kl}$ for obtaining the position $(x_{1j}, x_{2j})$, six initial values of the camera parameters $b_{kl}$ for obtaining the position $(x_{1j}, x_{2j})$, and three initial values of the camera parameters $c_{kl}$, of the second set of the parameter parameters for the second camera are required for each camera. For example, for the two cameras 11 and 12, a total of sixty initial values of the camera parameters are required.

When the distance measuring routine is started, the processing unit 20 obtains images, referred to captured images, simultaneously captured by the respective cameras 11 and 12 in step S110.

In step S120, the processing unit 20 extracts, from the captured image obtained from each of the cameras 11 and 12, image points, i.e. corresponding points; each corresponding point is estimated to represent a common three-dimensional position. Note that, when extracting the corresponding point, the processing unit 20 can perform one of known methods. For example, the processing unit 20 can obtain an image feature quantity at each point on the captured image obtained from the camera 11, and obtain an image feature quantity at each point on the captured image obtained from the camera 12. Then, the processing unit 20 can extract, from each of the captured images, corresponding points; the image feature quantity of each of the corresponding points from one of the captured images is similar to the image feature quantity of the corresponding one of the corresponding points from the other of the captured images. Hereinafter, the extracted number of the corresponding points from each of the captured images will be referred to as W (W is a positive integer).

In step S130, the processing unit 20 selects one of the corresponding points extracted in step S120 as a restoration target point.

In step S140, the processing unit 20 selects one of the captured images obtained from the respective cameras 11 and 12 as a target image.

Figure 6:
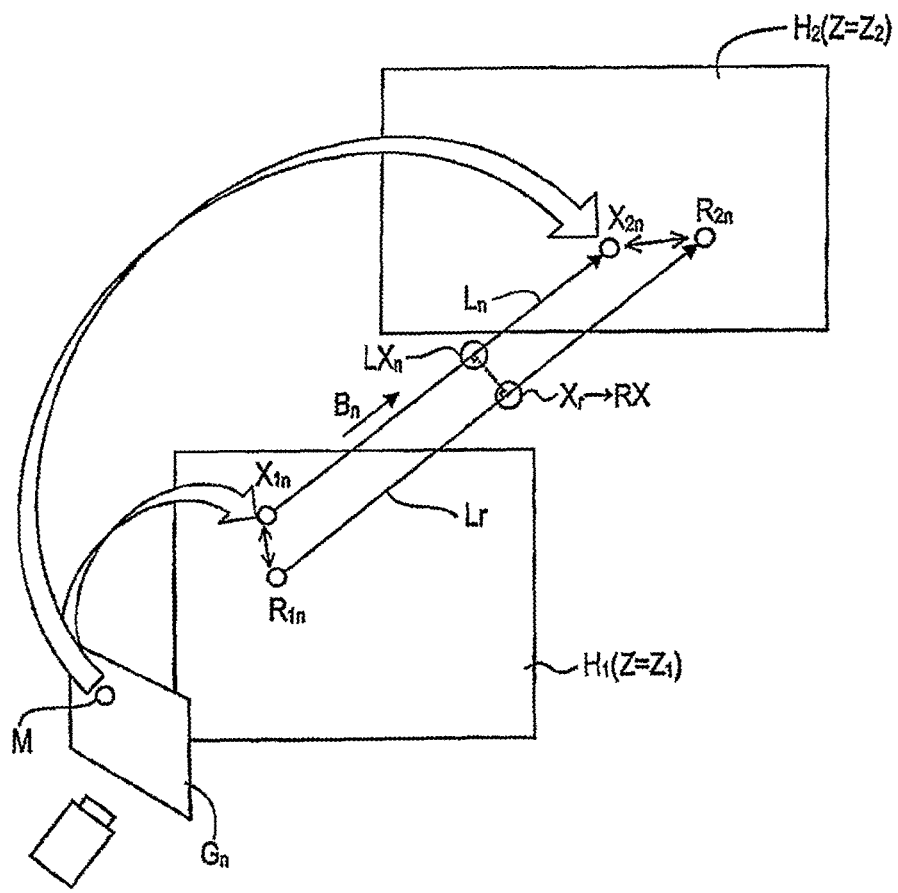
FIG. 6 is a diagram describing a restored point and a reprojected point according to the exemplary embodiment.

In step S150, the processing unit 20 uses the camera parameters $a_{kl}$ stored in the memory 22 to calculate projected points $X_j(x_{1j}, x_{2j})$ from the selected restoration target point $M(m_1, m_2)$ on the image plane $G_n$ of the target image to the respective common planes $H_j$ in accordance with the equation (2) (see FIG. 6).

Next, in step S160, the processing unit 20 calculates a back projection beam L, which is a three-dimensional linear line, in accordance with the three-dimensional coordinates $(x_{11}, x_{21}, Z_1)$ of the projected point $X_1$ on the common plane $H_1$ and the three-dimensional coordinates $(x_{12}, x_{22}, Z_2)$ of the projected point $X_2$ on the common plane $H_2$; the back projection beam L connects the projected points $X_1$ and $X_2$.

In step S170, the processing unit 20 determines whether the operations in steps S140 to S160 for the restoration target point selected in step S130 have been carried out for all the captured images from the cameras 11 and 12. Upon determination that the operations in steps S140 to S160 for the restoration target point selected in step S130 have been carried out for all the captured images from the cameras 11 and 12, the processing unit 20 performs the following operation in step S180. Otherwise, upon determination that the operations in steps S140 to S160 for the restoration target point selected in step S130 have not been carried out for all the captured images from the cameras 11 and 12, the processing unit 20 returns to step S140, and repeats the operations in steps S140 and S150.

This results in the processing unit 20 having calculated a number of back projection beams for the selected restoration target point M; the number of back projection beams corresponds to the number of the cameras. That is, N back projection beams are calculated.

In step S180, the processing unit 20 calculates, based on the total N back projection beams L corresponding to the number of the cameras, a restored point RX for the selected restoration target point M; the restored point RX represents the three-dimensional position of the selected restoration target point M. The three-dimensional position is located at the point of intersection of the N back projection beams L if there is no measurement error. However, there may be no point of intersection of the N back projection beams L. From this point, the processing unit 20 calculates, as the restored point RX, a three-dimensional point in accordance with the following equation (4) by 1. Calculating square distances between each three-dimensional point and the respective N back projection beams
2. Calculating the sum of the square distances for each of the three-dimensional points
3. Selecting, as the restored point RX, one of the three-dimensional points at which the sum of the square distances becomes minimum $$RX = \operatorname*{argmin}_{X_r} \sum_{n=1}^{N} \|X_r - LX_n\|^2 \qquad (4)$$

Where the function "arg min f(x)" represents a function that shows a value x at which f(x) becomes minimum.

For example, as illustrated in FIG. 6, it is assumed that
1. A projected point from the imaging plane $G_n$ of the n-th camera to each of the common planes is referred to as $X_{jn}$
2. A Beam vector, i.e. a unit vector, representing the orientation of a back projection beam $L_n$ passing through the projected point $X_{jn}$ is referred to as $B_n$.

In this assumption, in order to calculate the distance between any restoration candidate point $X_r$ and the beam $L_n$, the processing unit 20 calculates, in accordance with the following equation (5), a value $LX_n$, which is obtained by projecting the restoration candidate point $X_r$ on the beam $L_n$:

$$LX_n = X_{1n} + B_n B_n^T (X_r - X_{1n}) \qquad (5)$$

In addition, the beam vector $B_n$ is expressed by the following equation (6):

$$B_n = \frac{(X_{2n} - X_{1n})}{\|X_{2n} - X_{1n}\|} \qquad (6)$$

Then, the processing unit 20 calculates, as a restored point RX that is a finally restored three-dimensional point, one of the restoration candidate points $X_r$ that minimizes the sum of the distances from the corresponding one of the restoration candidate points $X_r$ to the beams $L_n$ obtained from all the cameras as described in the equation (4).

In step S190, the processing unit 20 determines whether the operations in steps S130 to S180 have been carried out for all the corresponding points, i.e. the W corresponding points, extracted in step S120. Upon determination that the operations in steps S130 to S180 have been carried out for all the corresponding points extracted in step S120, the processing unit 20 performs the following operation in step S190. Otherwise, upon determination that there is at least one corresponding point for which the operations in steps S130 to S180 have not been carried out, the processing unit 20 returns to step S130, and repeats the operations in steps S130 to S180.

In step S200, the W restored points RX calculated in step S180 are referred to as a restored-point group {RX}, and eight camera parameters used for calculating the restored-point group {RX} is referred to as a camera-parameter group {A}. Then, in step S200, the processing unit 20 calibrates the restored-point group {RX} and the camera-parameter group {A}. In addition, the processing unit 20 updates values of the camera parameters stored in the memory 22 using the calibrated camera-parameter group {A}.

First, the processing unit 20 calculates a reprojection error $E_w$ for each of the W restored points where w is 1, 2, ..., W.

That is, referring to FIG. 6, the processing unit 20 projects a w-th restored point RX on each common plane along the beam vector $B_n$ used for calculation of the w-th restored point RX, thus obtaining a reprojected point $R_{jn}$ on each common plane $H_j$. Then, the processing unit 20 calculates the reprojection error $E_w$ based on the reprojected point $R_{jn}$ and the following equation (7):

$$E_w = \sum_{n=1}^{N} \sum_{j=1}^{2} \|X_{jn} - R_{jn}\|^2 \tag{7}$$

That is, the processing unit 20 uses the projected points $X_{jn}$ and the reprojected points $R_{jn}$ obtained for the respective N cameras and the respective common planes $H_j$ to calculate the sum of the distances between the projected points $X_{jn}$ and the corresponding reprojected points $R_{jn}$ as the reprojection error $E_w$.

Next, the processing unit 20 performs known bundle adjustment that adjusts values of the restored-point group {RX} and values of the camera-parameter group {A} to correspondingly minimize the total sum of the reprojection errors $E_w$ calculated for all the restored points categorized in the restored-point group {RX} in accordance with the following equation (8):

$$\{\{A\}, \{RX\}\} = \operatorname*{argmin}_{\{A\},\{RX\}} \sum_{w=1}^{W} E_w \tag{8}$$

That is, the processing unit 20 performs the bundle adjustment to successively obtain the total sum of the reprojection errors $E_w$ of the calibrated restored-point group {RX} using the calibrated camera-parameter group {A}. Because the specific procedure of the bundle adjustment is well-known, the descriptions of which are omitted in this embodiment.

Following the operation in step S210, the processing unit 20 uses the calibrated restored-point group {RX} obtained in step S210 to calculate distance information about three-dimensional distances from the reference plane defined for the apparatus 1 to the respective restored points in the restored-point group {RX} in step S220. In other words, the processing unit 20 uses the calibrated restored-point group {RX} obtained in step S210 to calculate distance information about three-dimensional distances from the reference plane defined for the apparatus 1 to various objects, which correspond to the respective restored points in the restored-point group {RX}, included in the captured images by the cameras 11 and 12 in step S220.

Then, the processing unit 20 supplies the distance information to each in-vehicle devices via the in-vehicle network, and thereafter, terminates the distance calculating routine.

[4. Experiment]

Next, the following describes the results of measurement experiment of three-dimensional distances using the position measuring apparatus 1.

In this experiment, as illustrated in FIG. 3, the front windshield and an acrylic glass plate disposed in front of the front windshield are located in front of the cameras 11 and 12 as the nonlinear distortion factors in order to generate complicated refraction.

Figure 7:
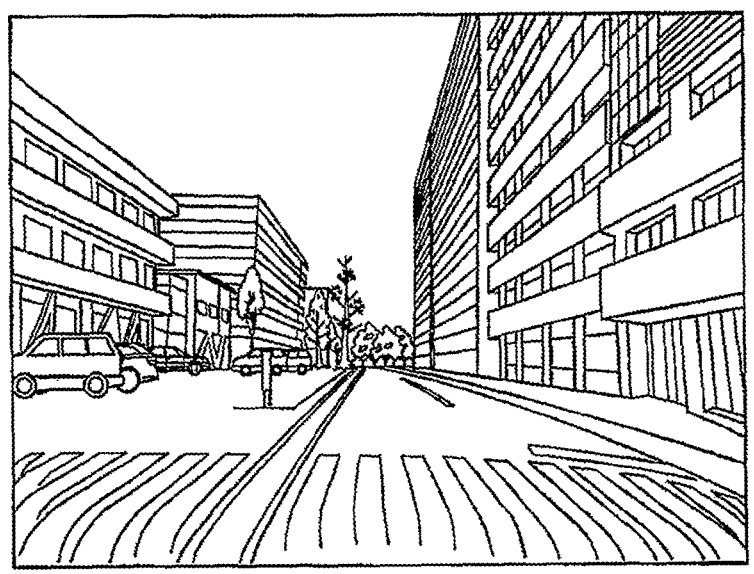
FIG. 7 is a diagram illustrating an example of an image captured through the front windshield of a vehicle.

FIG. 7 illustrates an example of an image captured by each of the cameras 11 and 12 through the front windshield. As illustrated in FIG. 7, the image is distortedly observed due to, for example, refraction of light by the front windshield. In particular, because this experiment additionally uses the acrylic glass plate, a part of an image captured through the acrylic glass plate is expected to have greater distortion.

In this experiment, a display was disposed on a translation wagon. The display was moved to the position corresponding to the common plane $H_1$, and the test pattern P was displayed on the display. Then, the test pattern P displayed on the display was captured by the cameras 11 and 12, and the captured images were used as the restoration target. Similarly, the display was moved to the position corresponding to the common plane $H_2$, and the test pattern P was displayed on the display. Then, the test pattern P displayed on the display was captured by the cameras 11 and 12, and the captured images were used as the restoration target.

Figure 8:
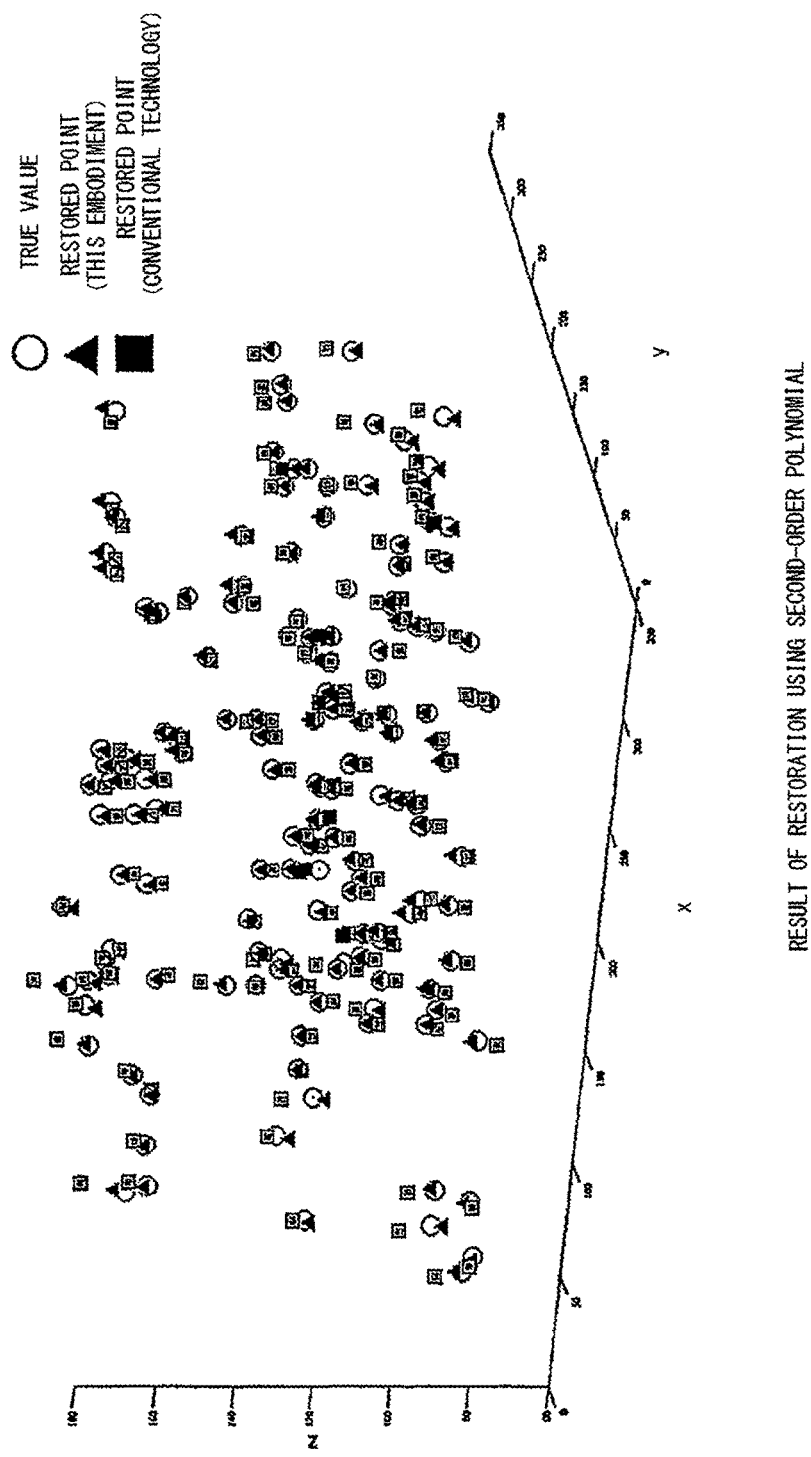
FIG. 8 is a graph illustrating a restored result of the test pattern obtained by restoring the test pattern using the position measuring apparatus illustrated in FIG. 1, which uses a second-order polynomial as a nonlinear map from each image plane to a common plane.
Figure 9:
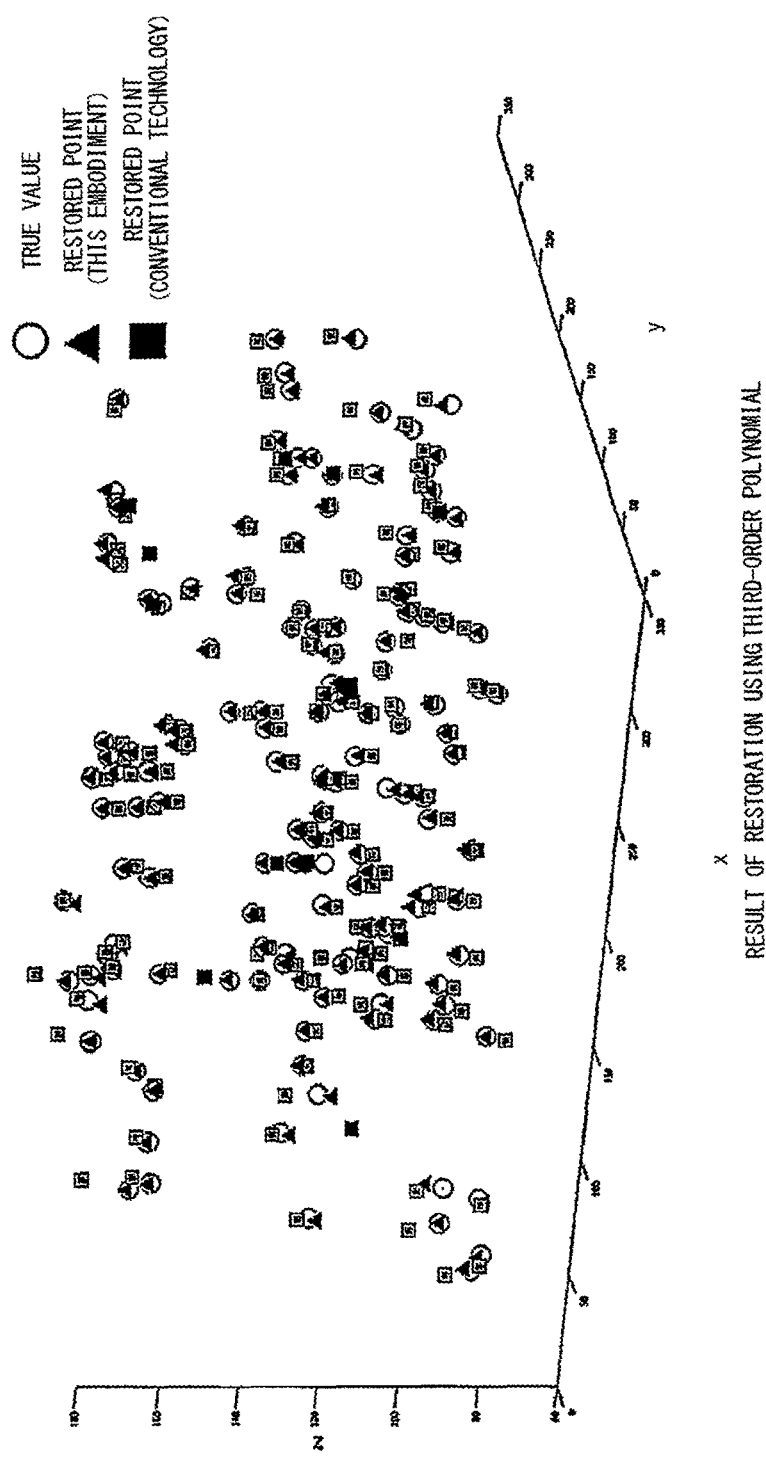
FIG. 9 is a graph illustrating a restored result of the test pattern obtained by restoring the test pattern using the position measuring apparatus illustrated in FIG. 1, which uses a third-order polynomial as a nonlinear map from each image plane to the common plane.

FIG. 8 illustrates the restored results of this experiment when the order of the polynomial expression defining the camera parameters is set to 2. FIG. 9 also illustrates the restored results of this experiment when the order of the polynomial expression defining the camera parameters is set to 3.

Each of FIGS. 8 and 9 illustrates

1. The results of the three-dimensional restoration using the above present method based on the position measuring apparatus 1
2. The results of the three-dimensional restoration using a conventional method based on a single-focal camera model
3. True values FIGS. 8 and 9 show that the present method based on the position measuring apparatus 1 using any of the second-order polynomial and the third-order polynomial achieves three-dimensional distance measurement with higher accuracy than the conventional method.

The average restoration error obtained by the conventional method is 4.3 mm, but the average restoration error obtained by the present method using the second-order polynomial is 1.38 mm, and the average restoration error obtained by the present method using the third-order polynomial is 1.18 mm.

That is, this demonstrates that an increase of the order of the polynomial enables the accuracy of the three-dimensional distance measurement to be further improved.

[5. Advantageous Effect]

The position measuring apparatus 1 according to the present embodiment described in detail above achieves the following advantageous effects.

The position measuring apparatus 1 uses, as the camera model, the non-single-focal camera model. This enables the three-dimensional position of an imaging target included in the captured images by the cameras 11 and 12 to be measured with higher accuracy even if light refraction has effects upon the captured images.

The non-single-focal camera model of the position measuring apparatus 1 according to the present embodiment needs to define two planes arranged to sandwich a restoration space; a point on the imaging plane captured by each of the cameras 11 and 12 is to be projected on each of the two planes.

As these two planes, the non-single-focal camera model is configured

1. Not to define a first pair of two planes for the camera 11 and a second pair of two planes for the camera 12, which are different from the two planes of the first pair 2. Instead, to define common planes $H_1$ and $H_2$ shared by the cameras 11 and 12

This configuration enables the non-single-focal camera model to describe the state of each of the cameras 11 and 12 without using extrinsic parameters. This reduces the number of the camera parameters required for the non-single-focal camera model according to the present embodiment as compared with the number of the camera parameters required for the conventional non-single-focal camera model.

That is, the position measuring apparatus 1 is configured to eliminate the need to use the extrinsic parameters. This results in calibration of the camera parameters being more simplified, and the calibration accuracy of the camera parameters to be more improved.

The position measuring apparatus 1 according to the present embodiment uniquely defines the reprojection error $E_w$ as expressed by the above equation (7). This enables bundle adjustment to be applied to calibration of the restored-point group {RX} and the camera-parameter group {A}. That is, the position measuring apparatus 1 enables calibration of the restored-point group {RX} and calibration of the camera-parameter group {A} to be simultaneously carried out. For this reason, even if the posture of the camera 11 or camera 12 fluctuates due to, for example, vibration, it is possible to continuously perform three-dimensional position measurement, and therefore three-dimensional distance measurement while actually correcting the fluctuations.

The position measuring apparatus 1 is configured such that an increase of the order of the polynomial used for projection from the imaging plane $G_n$ to each common plane $H_j$ enables three-dimensional position measurement, and therefore three-dimensional distance measurement to be carried out with higher accuracy. For example, if a third-order polynomial is used, it can be expressed by the following matrix equation (9):

$$\begin{pmatrix} x_1 \\ x_2 \end{pmatrix} = \tag{9}$$

-continued $$\frac{1}{\lambda}\begin{pmatrix} a_{30} & a_{21} & a_{12} & a_{03} & a_{20} & a_{11} & a_{02} & a_{10} & a_{01} & a_{00} \\ b_{30} & b_{21} & b_{12} & b_{03} & b_{20} & b_{11} & b_{02} & b_{10} & b_{01} & b_{00} \end{pmatrix} \begin{pmatrix} m_1^3 \\ m_1^2 \times m_2 \\ m_1 \times m_2^2 \\ m_2^3 \\ m_1^2 \\ m_1 \times m_2 \\ m_2^2 \\ m_1 \\ m_2 \\ 1 \end{pmatrix}$$

[6. Modifications]

The embodiment of the present invention has been described, but the present invention is not limited to the above embodiment, and can be variously modified.

Parameters defined by the equations (2) and (3), i.e. parameters defined by the combination of the nonlinear transformation using a K-th order polynomial and plane projective transformation with each other, are used as the camera parameters of the position measuring apparatus 1. The present invention is however not limited to the parameters. Specifically, the camera parameters defined based on one of known other models can be used.

The functions of one element in the above embodiment can be distributed as plural elements, and the functions that plural elements have can be combined into one element. At least part of the structure of the embodiment can be replaced with a known structure having the same function as the at least part of the structure of the embodiment. A part of the structure of the above embodiment can be eliminated. At least part of the structure of the above embodiment can be added to or replaced with the structure of the modifications. All aspects included in the technological ideas specified by the language employed by the claims constitute embodiments of the present invention.

The present invention can be implemented by various embodiments in addition to the position measuring apparatus 1; the various embodiments include systems each including the position measuring apparatus 1, programs for serving a computer as the position measuring apparatus 1, storage media storing the programs, and position measuring methods.

What is claimed is:

1. A position measuring apparatus for measuring a three-dimensional position from a reference plane, the position measuring apparatus comprising:
   an image obtaining unit configured to obtain first and second images captured by respective first and second cameras from different viewpoints of the first and second cameras, the first and second images containing a common imaging region;
   a storage unit configured to store:
      a first camera parameter that represents a relationship between a first imaging plane included in the first image and each of first and second common planes based on a camera model; and
      a second camera parameter that represents a relationship between a second imaging plane included in the second image and each of the first and second common planes based on the camera model,
   the camera model describing nonlinear map relationships from each of first and second imaging planes to the first and second common planes, the first and second common planes being respectively set to have different positions relative to the reference plane in a depth direction of a world coordinate system;

a correspondence detector configured to detect, from the respective first and second imaging planes of the first and second images, first and second corresponding points on the respective first and second imaging planes, the first and second corresponding points being estimated to represent a common three-dimensional position;

a projected-point calculator configured to calculate, based on the first and second camera parameters stored in the storage unit, first to fourth projected points, the first projected point representing a projected point of the first corresponding point on the first common plane, the second projected point representing a projected point of the first corresponding point on the second common plane, the third projected point representing a projected point of the second corresponding point on the first common plane, the fourth projected point representing a projected point of the second corresponding point on the second common plane; and a restored-point calculator configured to calculate:
  a line connecting the first projected point on the first common plane and the second projected point on the second common plane as a first beam;
  a line connecting the third projected point on the first common plane and the fourth projected point on the second common plane as a second beam; and
  a point having a minimum square distance relative to each of the first and second beams as a restored point, the restored point representing the three-dimensional position of the first and second corresponding points.

2. The position measuring apparatus according to claim 1, further comprising:
a calibrator configured to:
  perform bundle adjustment of the restored point calculated by the restored-point calculator, and the first and second camera parameters stored in the storage unit to calibrate the restored point and values of the first and second camera parameters; and
  update, based on the calibrated values of the first and second camera parameters, values of the first and second camera parameters stored in the storage unit.

3. The position measuring apparatus according to claim 2, wherein:
the calibrator is configured to:
perform a first task to obtain:
  a first reprojected point representing a projected point of the calibrated restored point along the first beam on the first common plane;
  a second reprojected point representing a projected point of the calibrated restored point along the first beam on the second common plane;
  a third reprojected point representing a projected point of the calibrated restored point along the second beam on the first common plane; and
  a fourth reprojected point representing a projected point of the calibrated restored point along the second beam on the second common plane; and
obtain a total sum of distances between the first to forth projected points to the respective first to fourth reprojected points as a value of an evaluation function of used for the bundle adjustment.

4. The position measuring apparatus according to claim 1, further comprising a distance calculator configured to calculate a three-dimensional distance of the restored point relative to the reference plane.

5. The position measuring apparatus according to claim 2, further comprising a distance calculator configured to calculate a three-dimensional distance of the restored point relative to the reference plane.

6. The position measuring apparatus according to claim 3, further comprising a distance calculator configured to calculate a three-dimensional distance of the restored point relative to the reference plane.

* * * * *